Patented June 15, 1926.

1,589,081

UNITED STATES PATENT OFFICE.

RUDOLF ADLER, OF CARLSBAD, CZECHOSLOVAKIA.

ADSORPTIVE CHARCOAL FOR MEDICINAL PURPOSES.

No Drawing. Application filed February 23, 1921, Serial No. 447,213, and in Czechoslovakia December 5, 1919.

Adsorptive charcoal for medicinal purposes, in the shape of compressed bodies of powder, tablets, granules, pills and the like, is chiefly produced in the following way: The charcoal is mixed with binding materials such as gelatinous substances, gums and resins, starch, dextrin, and the like, and, after gradual granulation and compression, is dried.

Practice, however, has shown that the charcoal preparations produced in this manner have no action—or only little action—and it is found that under certain circumstances, for example with diabetic subjects, such preparations have an injurious action.

It has now been found that charcoal preparations of excellent action can be obtained if in place of the customary materials hitherto used for binding together the preferably finely divided charcoal, such materials are employed which are not, or only in comparatively small quantities, adsorbed by the charcoal.

Elastic clays, jelly-like silicates, gypsum and the like have shown themselves as particularly suitable for this purpose.

*Example.*—70 kg. of adsorption charcoal are mixed with 30 kg. of plastic clay, kneaded with the addition of 70 litres of water until a homogeneous mass is obtained and then shaped in the tablet machine. The moist tablets are subsequently dried at a temperature of about 70°.

In this particular case, the masses retain their shape after drying. The durability of the formed shape is dependent upon the quantity of the fine charcoal powder which—in the ceramic sense—represents the thinning substance. By the addition of large quantities of charcoal shapes are obtained which are easily crumbled in water or other liquids, while on the other hand by the addition of small quantities of charcoal the shapes have greater durability.

For pills, compressed bodies of powder, and the like, in which a quick and complete disintegration is desired in the mouth or in the digestive tract, and which, when saturated with water, are required to give a homogeneous suspension, the amount of charcoal added would have to be considerably greater than in the production of flat discs, cones, or sticks and the like, which are to be used as disinfectants and toxin fixing bodies for introduction into wounds, and have therefore to retain their shape.

The plastic charcoal masses can, if required, before being shaped, be admixed with other medicated substances, if these are to act at the same time as the adsorption charcoal.

I claim as my invention:

1. A medicinal charcoal preparation in compressed body form consisting of a mixture of powdered adsorptive charcoal, and an inorganic binding material.

2. A medicinal charcoal preparation in compressed body form consisting of a mixture of powdered adsorptive charcoal, and a plastic clay.

In testimony whereof I have hereunto set my hand.

DR. RUDOLF ADLER.